(12) United States Patent
Iida et al.

(10) Patent No.: US 11,894,521 B2
(45) Date of Patent: Feb. 6, 2024

(54) SECONDARY BATTERY (71) Applicant: Panasonic Intellectual Property Management Co., Ltd., Osaka (JP)

(72) Inventors: Kazuhiro Iida, Osaka (JP); Takayuki Nakatsutsumi, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 604 days.

(21) Appl. No.: 17/056,229

(22) PCT Filed: Feb. 21, 2019

(86) PCT No.: PCT/JP2019/006653
§ 371 (c)(1),
(2) Date: Nov. 17, 2020

(87) PCT Pub. No.: WO2019/230077
PCT Pub. Date: Dec. 5, 2019

(65) Prior Publication Data
US 2021/0218064 A1 Jul. 15, 2021

(30) Foreign Application Priority Data
Jun. 1, 2018 (JP) ................. 2018-106458

(51) Int. Cl.
*H01M 10/0569* (2010.01)
*H01M 4/36* (2006.01)
(Continued)

(52) U.S. Cl.
CPC ....... *H01M 10/0569* (2013.01); *H01M 4/364* (2013.01); *H01M 4/386* (2013.01);
(Continued)

(58) Field of Classification Search
CPC .......... H01M 10/052; H01M 10/0525; H01M 10/0569; H01M 2004/027;
(Continued)

(56) References Cited

U.S. PATENT DOCUMENTS

2016/0043441 A1    2/2016  Chiga
2017/0162909 A1*   6/2017  Omae ............... H01M 10/0525
(Continued)

FOREIGN PATENT DOCUMENTS

CN    103972588 A    8/2014
CN    106537680 A    3/2017
(Continued)

OTHER PUBLICATIONS

International Search Report dated May 28, 2019, issued in counterpart Application No. PCT/JP2019/006653 (5 pages).
(Continued)

*Primary Examiner* — Lingwen R Zeng
(74) *Attorney, Agent, or Firm* — WHDA, LLP (57) ABSTRACT

A secondary battery includes a negative electrode containing a lithium silicate phase and silicon particles dispersed in the lithium silicate phase and an electrolytic solution containing a fluorine-containing linear carboxylic acid ester represented by $R^1$—(CO)O—$CH_2$—$R^2$ (wherein $R^1$ is an alkyl group and $R^2$ is an alkyl group in which at least one hydrogen atom is substituted with fluorine).

5 Claims, 2 Drawing Sheets (51) Int. Cl.
*H01M 4/58* (2010.01)
*H01M 10/0525* (2010.01)
*H01M 4/38* (2006.01)
*H01M 4/02* (2006.01)
*H01M 4/134* (2010.01)
*H01M 10/052* (2010.01)
*H01M 4/136* (2010.01)

(52) U.S. Cl.
CPC ..... *H01M 4/5825* (2013.01); *H01M 10/0525* (2013.01); *H01M 4/134* (2013.01); *H01M 4/136* (2013.01); *H01M 10/052* (2013.01); *H01M 2004/027* (2013.01); *H01M 2220/20* (2013.01); *H01M 2300/0034* (2013.01); *Y02E 60/10* (2013.01)

(58) Field of Classification Search
CPC ..... H01M 2220/20; H01M 2300/0034; H01M 4/134; H01M 4/136; H01M 4/1395; H01M 4/1397; H01M 4/364; H01M 4/386; H01M 4/5825; Y02E 60/10
See application file for complete search history.

(56) References Cited

U.S. PATENT DOCUMENTS

2017/0214041 A1\* 7/2017 Minami ................ H01M 4/485
2017/0331102 A1 11/2017 Akira et al.

FOREIGN PATENT DOCUMENTS

| | | |
|---|---|---|
| CN | 107112521 A | 8/2017 |
| JP | 2008-159419 A | 7/2008 |
| JP | 2013-161705 A | 8/2013 |
| JP | 2017-208186 A | 11/2017 |
| WO | 2015/004841 A1 | 1/2015 |
| WO | 2016/035290 A1 | 3/2016 |

OTHER PUBLICATIONS

Extended (Supplementary) European Search Report dated Jun. 17, 2021, issued in counterpart EP application No. 19810460.6. (6 pages).

English Translation of Chinese Search Report dated Aug. 31, 2023, issued in counterpart CN application No. 201980021714.1. (3 pages).

\* cited by examiner

SECONDARY BATTERY

TECHNICAL FIELD

The present disclosure mainly relates to the improvement of an electrolytic solution of a secondary battery.

BACKGROUND ART

Nonaqueous electrolyte secondary batteries, especially lithium ion secondary batteries, because of having a high voltage and a high energy density, have been expected to serve as a power supply for small consumer product purposes and for power storage devices and electric automobiles. Amid the desire for a higher energy density in batteries, a material containing silicon (silicon) alloyed with lithium has been expected to be used as a negative electrode active material having a high theoretical capacity density.

PTL 1 discloses that, by dispersing silicon particles having a small particle diameter in a lithium silicate phase represented by $Li_{2z}SiO_{2+z}$ ($0<z<2$), a volume change in association with charging/discharging is prevented or reduced and the initial charge/discharge efficiency is enhanced.

CITATION LIST

Patent Literature

PTL 1: Brochure of International Publication No. 2016/035290

SUMMARY OF INVENTION

Technical Problem

A high capacity can be expected of a secondary battery that contains a negative electrode material containing silicon particles and a lithium silicate phase by increasing the content of the silicon particles in the battery.

On the other hand, the secondary battery is likely to experience a deterioration in rate performance in association with repeated charging/discharging.

Solution to Problem

A secondary battery according to an embodiment of the present disclosure includes a negative electrode containing a lithium silicate phase and silicon particles dispersed in the lithium silicate phase and an electrolytic solution containing a fluorine-containing linear carboxylic acid ester represented by $R^1$—(CO)O—$CH_2$—$R^2$ (wherein $R^1$ is an alkyl group and $R^2$ is an alkyl group in which at least one hydrogen atom is substituted with fluorine).

Advantageous Effects of Invention

According to the present disclosure, it is possible to realize a secondary battery excelling in rate performance.

While the novel characteristics of the present invention are described in the appended claims, both the structure and content of the present invention, together with other objects and characteristics thereof, will be better understood from the following detailed description in light of the drawings.

DESCRIPTION OF EMBODIMENTS

A secondary battery according to an embodiment of the present disclosure includes a negative electrode containing a lithium silicate phase and silicon particles dispersed in the lithium silicate phase. An electrolytic solution contains a fluorine-containing linear carboxylic acid ester represented by $R^1$—(CO)O—$CH_2$—$R^2$ (wherein $R^1$ is an alkyl group and $R^2$ is an alkyl group in which at least one hydrogen atom is substituted with fluorine).

That is, the electrolytic solution contains an ester compound of a non-fluorine-containing carboxylic acid and an alcohol having an alkyl group in which at least one hydrogen atom is substituted with fluorine.

In the secondary battery that contains a negative electrode material containing a lithium silicate phase and silicon particles dispersed in the lithium silicate phase, a deterioration in rate performance is prevented or reduced when the electrolytic solution contains the fluorine-containing linear carboxylic acid ester having the above-described structure. Hereafter, the lithium silicate phase and the silicon particles dispersed in the lithium silicate phase will be collectively referred to as a "silicon composite".

A secondary battery that includes a negative electrode containing a silicon composite has high initial charge/discharge efficiency compared with a secondary battery that includes a negative electrode containing silicon oxide ($SiO_x$). On the other hand, the secondary battery that includes a negative electrode containing the silicon composite is likely to experience a deterioration in rate performance. For example, in association with repeated charging/discharging, the capacity when high-rate (current) discharging is performed is likely to deteriorate compared with when low-rate discharging is performed. A conceivable reason therefor is that, when high-rate (current) charging/discharging is performed, due to a drastic volume fluctuation of silicon particles, cracks are likely to occur in base particles containing a lithium silicate phase. When cracks occur in the base particles, an electrolytic solution enters the lithium silicate phase through the cracks and is decomposed. As a result, a resistant layer hampering the transfer of lithium ions can be formed in the lithium silicate phase. The formation of such a resistant layer causes a deterioration in rate performance.

However, when the electrolytic solution contains the above-described fluorine-containing linear carboxylic acid ester, a deterioration in rate performance is prevented or reduced. A conceivable reason therefor is that the fluorine-containing linear carboxylic acid ester forms an SEI (Solid Electrolyte Interphase) film (hereafter an SEI film may be referred to as "SEI") on the surface of the base particles containing the lithium silicate phase, thereby preventing or reducing the occurrence of cracks in the base particles.

For example, when the fluorine-containing linear carboxylic acid ester is 2,2,2-trifluoroethyl acetate ($CH_3$—(CO)O—$CH_2$—$CF_3$) (FEA), the reduction reaction in Formula (1) below can occur on the surface of the base particles.

[Chem. 1]

FEA

As a result of the reduction reaction product in Formula (1) undergoing repeated polymerization, a polymer having a unit structure in Formula (2) below can be produced. The polymer becomes an SEI film derived from the fluorine-containing linear carboxylic acid ester. Each "*" in Formula (2) represents a bond.

[Chem. 2]

The Li atoms and the Si atoms in lithium silicate forming the silicon composite are positively charged. Thus, on the base particle interface, a strong mutual attraction exists between the Li atoms and the Si atoms in the lithium silicate and the negatively-charged F atoms in a polymer side chain in Formula (2), thereby causing the base particles and the polymer to adhere to one another. Accordingly, the strength of the base particle surface is increased, thereby potentially preventing or reducing the occurrence of cracks.

In Formula (2), conceivably, a lithium ion undergoes repeated coordination and transfer (hopping) to consecutive alkoxy groups in a main chain in the polymer, and thus lithium conductivity is exhibited. Because a fluorinated alkyl group present in the polymer side chain is an electron-attracting substituent, the electron density of the oxygen in the alkoxy groups is deteriorated. Thus, the coordination ability of the alkoxy groups toward a lithium ion is weak, and thus the hopping rate is increased. As a result, the polymer is less likely to serve as resistance to the transfer of lithium ions, thereby preventing or reducing a deterioration in rate performance.

Thus, with the fluorine-containing linear carboxylic acid ester represented by $R^1$—(CO)O—$CH_2$—$R^2$ contained in the electrolytic solution, an SEI having a small transfer resistance of lithium ions and exhibiting stability can be formed adhering to the base particle surface. Accordingly, a deterioration in performance when high-rate charging/discharging is performed is conceivably prevented or reduced. Furthermore, an increase in the battery internal resistance in association with repeated charging/discharging is prevented or reduced.

Here, $R^1$ represents an alkyl group and contains no fluorine. Furthermore, $R^1$ preferably has no electron-attracting functional groups other than fluorine either. The number of carbon atoms contained in $R^1$ is, for example, preferably 1 to 4, more preferably 1 or 2.

$R^2$ represents an alkyl group in which at least one hydrogen atom is substituted with fluorine. The number of fluorine atoms contained in $R^2$ is not limited. As the number of fluorine atoms contained in $R^2$ is larger, the electron density of the oxygen in an alkoxy group is decreased and thus lithium ions are easily transferred. As a result, the transfer resistance of lithium ions can be further decreased, thereby enhancing a preventive or reductive effect on the deterioration in performance when high-rate (current) charging/discharging is performed. With fluorine atoms contained in $R^2$, bonding to the Li atoms and the Si atoms in the lithium silicate is easily achieved, and thus the adhesion between the base particles and the polymer is easily achieved.

The number of carbon atoms contained in $R^2$ is, for example, preferably 1 to 4, more preferably 1 or 2. As the number of carbon atoms interposed between electron-attracting fluorine and an alkoxy group contained in $R^2$ is smaller, an effect of decreasing the electron density of the oxygen in the alkoxy group is increased and lithium ions are easily transferred. As a result, the transfer resistance of lithium ions is decreased, and thus a deterioration in performance when high-rate (current) discharging is performed is prevented or reduced.

When the number of carbon atoms contained in $R^2$ is 1 to 4, the number of fluorine atoms contained in $R^2$ is preferably 1 to 9, more preferably 3 to 5.

Thus, as the fluorine-containing linear carboxylic acid ester, the FEA (wherein $R^1$ is CH 3 and $R^2$ is CF) described above is most preferable.

The electrolytic solution contains a solvent and an electrolyte dissolved in the solvent. The content of the fluorine-containing linear carboxylic acid ester in the solvent is preferably 20% to 90% by volume, more preferably 40% to 90% by volume. The content of the fluorine-containing linear carboxylic acid ester can be measured by performing gas chromatography mass spectrometry on the electrolytic solution removed from a battery.

The electrolytic solution may contain 2-chloro-1,1-difluoroethyl-2,2,2-trifluoroethyl ether in Formula (3) below. In the negative electrode, the product of the HF elimination from the ether in Formula (3) can be copolymerized with the reaction product in Formula (1) to form a polymer. The polymer thus formed can further decrease the transfer resistance of lithium ions on the particle surface of the silicon composite.

The ether in Formula (3) with respect to the entire electrolytic solution is preferably 0.002% by mass or more and 0.1% by mass or less, more preferably 0.01% by mass or more and 0.05% by mass or less.

[Chem. 3]

[Silicon Composite]

The lithium silicate phase is preferably represented by a composition formula of $Li_ySiO_z$, wherein $0<y≤4$ and $0.2≤z≤5$ are satisfied, and more preferably represented by a composition formula of $Li_{2u}SiO_{2+u}$ ($0<u<2$). The lithium silicate phase may be $Li_2SiO_3$ (u=1) or $Li_2Si_2O_5$ (u=0.5), and $Li_2Si_2O_5$ is preferable.

Compared with $SiO_x$ which is a composite of $SiO_2$ and fine silicon having a crystallite size of about 5 nm, the lithium silicate phase contains a small site that can react with lithium and thus is less likely to produce irreversible capacity in association with charging/discharging. When silicon particles are dispersed in the lithium silicate phase, excellent charge/discharge efficiency is obtained during an initial charging/discharging period. Because the content of the silicon particles can be changed as desired, a high-capacity negative electrode can be designed.

The crystallite size of the silicon particles dispersed in the lithium silicate phase is, for example, 10 nm or more. The silicon particles have a particulate phase of silicon (Si) elementary substance. When the crystallite size of the silicon particles is 10 nm or more, a small surface area of the silicon particles can be maintained, and thus the degradation of the silicon particles accompanied by the production of irreversible capacity is less likely to occur. The crystallite size of the silicon particles is calculated with the Scherrer formula from the half-width of a diffraction peak attributed to the Si (111) plane of the silicon particles in an X-ray diffraction (XRD) pattern.

In the silicon composite, the silicon particles are dispersed in the lithium silicate phase; therefore, the expansion and contraction of the silicon composite in association with charging/discharging is prevented or reduced. However, when high-rate (current) charging/discharging is performed, due to a drastic volume fluctuation of the silicon particles, cracks are likely to occur in the lithium silicate phase. When cracks occur on the surface of the lithium silicate phase, the electrolytic solution enters the lithium silicate phase via the cracks, and as a result, a transfer resistant layer hampering the transfer of lithium ions can be formed in the lithium silicate phase. However, with the above-described fluorine-containing linear carboxylic acid ester contained in the electrolytic solution, an SEI having high lithium ion permeability is formed adhering to the surface of the silicate phase, and thus the occurrence of cracks is prevented or reduced even when high-rate (current) charging/discharging is performed.

On the other hand, in view of preventing or reducing the occurrence of cracks in the silicon particles in and of themselves, the average particle diameter of the silicon particles is, before initial charging, preferably 500 nm or less, more preferably 200 nm or less, and even more preferably 50 nm or less. After initial charging, the average particle diameter of the silicon particles is preferably 400 nm or less, more preferably 100 nm or less. By refining the silicon particles, the volume change during charging/discharging is decreased, and as a result, the structural stability of the silicon composite is further enhanced.

The average particle diameter of the silicon particles is measured by observing sectional SEM (scanning electron microscope) photographs of the silicon composite. Specifically, the average particle diameter of the silicon particles is calculated by averaging the maximum diameter of freely selected 100 of the silicon particles. The silicon particles are formed of a plurality of crystallites gathered together.

In view of a higher capacity, the content of the silicon particles dispersed in the lithium silicate phase is, preferably 20% by mass or more with respect to the mass of the entire silicon composite, more preferably 35% by mass or more with respect to the mass of the entire silicon composite. The diffusibility of lithium ions is bettered, and excellent load characteristics is easily obtained. On the other hand, in view of enhanced cycle characteristics, the content of the silicon particles is preferably 95% by mass or less with respect to the mass of the entire silicon composite, more preferably 75% by mass or less with respect to the mass of the entire silicon composite. A surface of the silicon particles not being covered with the lithium silicate phase and being exposed is decreased, and thus a side reaction between the electrolyte and the silicon particles is prevented or reduced. The content of the silicon particles can be measured through Si-NMR.

Desirable measurement conditions for Si-NMR are presented below.

Measurement apparatus: Solid-state nuclear magnetic resonance spectrum analyzer (INOVA-400), manufactured by Varian, Inc.
Probe: Varian 7 mm CPMAS-2
MAS: 4.2 kHz
MAS rate: 4 kHz
Pulse: DD (45° pulse signal acquisition time 1H decoupling)
Repetition time: 1200 sec
Observation width: 100 kHz
Center of observation: Approximately −100 ppm
Signal acquisition time: 0.05 sec
Number of scans: 560
Sample weight: 207.6 mg The composition of the lithium silicate phase $Li_ySiO_z$ can be analyzed, for example, through the following method.

First, the mass of the sample of the silicon composite is measured. The carbon content, the lithium content, and the oxygen content in the sample are then calculated as follows. The carbon content is subtracted from the mass of the sample, and the lithium content and the oxygen content in the remaining amount are calculated. From the resulting molar ratio of lithium (Li) to oxygen (O), the ratio of y to z is determined.

The carbon content is measured with a carbon/sulfur analyzer (e.g., Type EMIA-520 manufactured by HORIBA, Ltd.). The sample is weighted out on a magnetic board, and after a combustion improver is added thereto, the sample is inserted into a combustion furnace (carrier gas: oxygen) heated to 1350° C. The amount of carbon dioxide gas produced during combustion is detected through infrared absorption. A calibration curve is formed, for example, using carbon steel (carbon content 0.49%) manufactured by Bureau of Analysed Sampe. Ltd to thereby calculate the carbon content of the sample (high frequency induction heating furnace combustion-infrared absorption method).

The oxygen content is measured with an oxygen/nitrogen/hydrogen analyzer (e.g., Type EGMA-830 manufactured by HORIBA, Ltd.). The sample is placed in a Ni capsule, which is then introduced, together with Sn pellets and Ni pellets that serve as flux, into a carbon crucible heated with a power of 5.75 kw, and the released carbon monoxide gas is detected. A calibration curve is formed using a standard sample $Y_2O_3$ to thereby calculate the oxygen content of the sample (inert gas fusion-nondispersive infrared absorption method).

The lithium content is measured by entirely dissolving the sample in hot hydrofluoric-nitric acid (a heated acid mixture of hydrofluoric acid and nitric acid), removing the carbon in the dissolved residue through filtration, and thereafter analyzing the resulting filtrate through inductively coupled plasma emission spectrometry (ICP-AES). A calibration curve is formed using a commercially available standard solution of lithium to thereby calculate the lithium content of the sample.

The silicon content is the amount after subtracting the carbon content, the oxygen content, and the lithium content from the mass of the silicon composite sample. This silicon content includes contributions both from the silicon present in the form of the silicon particles and from the silicon present in the form of the lithium silicate. The content of the silicon particles can be calculated through Si-NMR, and the content of the silicon present in the form of the lithium silicate in the silicon composite is thus determined.

The silicon composite preferably forms a particulate material having an average particle diameter of 1 μm to 25 μm, more preferably 4 μm to 15 μm. In the above-described particle diameter range, the stress caused by a volume change of the silicon composite in association with charging/discharging is easily mitigated, and thus good cycle characteristics is easily obtained. The particles of the silicon composite also have an appropriate surface area, and thus capacity deterioration caused by a side reaction with a nonaqueous electrolyte is also prevented or reduced.

The term average particle diameter of the silicon composite particles refers to a particle diameter (volume average particle diameter) with which an integrated volume value is 50% in a particle size distribution measured through a laser diffraction/scattering method. As the measurement apparatus, for example, an "LA-750" manufactured by HORIBA, Ltd. (HORIBA) can be used.

The silicon composite particles preferably contain a conductive material coating at least a portion of the surface thereof. That is, a conductive layer containing the conductive material is disposed on at least a portion of the surface of the silicon composite.

Due to the poor electronic conductivity of the lithium silicate phase, the conductivity of the silicon composite also tends to be low. The conductivity can be dramatically increased by coating the surface with the conductive material. Preferably, the conductive layer has a thickness small enough not to substantially affect the average particle diameter of the silicon composite. An SEI film derived from the fluorine-containing linear carboxylic acid ester can be formed on the conductive layer and/or on an exposed surface of the silicon composite, the surface not being coated with the conductive layer. However, even when the entire surface of the silicon composite particles is coated with the conductive layer, in association with repeated charging/discharging, cracks may occur in the conductive layer on the particle surface, and as a result, the silicon composite may be exposed. In this case, with the SEI film derived from the fluorine-containing linear carboxylic acid ester being formed on such an exposed location of the silicon composite, a preventive or reductive effect on the deterioration in high-rate (current) charge/discharge characteristics is exhibited.

Next, a method for manufacturing the silicon composite will be described in detail.

In general, the silicon composite is synthesized through two processes, namely, a pre-step of obtaining lithium silicate and a post-step of obtaining a silicon composite from the lithium silicate and raw material silicon. More specifically, the method for manufacturing the silicon composite preferably includes (i) a step of mixing silicon dioxide and a lithium compound and firing the resulting mixture to thereby obtain lithium silicate and (ii) a step of combining the lithium silicate and raw material silicon to thereby obtain a silicon composite including a lithium silicate phase and silicon particles dispersed in the lithium silicate phase.

The u value of lithium silicate represented by the formula: $Li_{2u}SiO_{2+u}$ is controlled using the atomic ratio: Li/Si of silicon to lithium in the mixture of silicon dioxide and a lithium compound. To synthesize good lithium silicate that causes less dissolution of the alkali component, Li/Si is preferably smaller than 1.

As the lithium compound, for example, lithium carbonate, lithium oxide, lithium hydroxide, or lithium hydride can be used. These may be used alone or in a combination of two or more kinds.

Preferably, the mixture containing silicon dioxide and the lithium compound is heated in air at 400° C. to 1200° C., preferably at 800° C. to 1100° C., to thereby react the silicon dioxide with the lithium compound.

Next, the lithium silicate and raw material silicon are combined. For example, a mixture of the lithium silicate and the raw material silicon is pulverized while shearing force is applied to the mixture. As the raw material silicon, silicon coarse particles having an average particle diameter of about several μm to several tens of μm is used. The finally obtained silicon particles are preferably controlled to have a crystallite size of 10 nm, the crystallite size being calculated with the Scherrer formula from the half-width of a diffraction peak attributed to the Si (111) plane in an XRD pattern.

For example, the lithium silicate and the raw material silicon are mixed in a predetermined mass ratio, and, a pulverizer such as a ball mill is used to stir the mixture while atomizing the mixture. However, the combination step is not limited thereto. For example, without using a pulverizer, silicon nanoparticles and lithium silicate nanoparticles may be synthesized and mixed.

Next, for example, in an inert atmosphere (e.g., in an atmosphere of argon, nitrogen, or the like), the atomized mixture is heated at 450° C. to 1000° C. and fired. Here, firing may be performed with pressure applied to the mixture, for example, by a hot press, to produce a sintered body of the mixture (silicon composite). The lithium silicate is stable at 450° C. to 1000° C. and hardly reacts with silicon. Thus, a deterioration in capacity, if any, is minor.

The sintered body is then pulverized to be particulate to thereby produce silicon composite particles. Here, by appropriately selecting pulverizing conditions, for example, silicon composite particles having an average particle diameter of 1 μm to 25 μm can be obtained.

Next, a conductive layer may be formed by coating at least a portion of the surface of the silicon composite particles with a conductive material. The conductive material is preferably electrochemically stable and is preferably a carbon material. Examples of the method for coating the surface of a particulate material with a carbon material include a CVD method using hydrocarbon gas such as acetylene or methane as a raw material or a method in which, for example, a coal pitch, a petroleum pitch, or a phenolic resin is mixed with a particulate material, and the mixture is heated to be carbonized. Carbon black may be caused to adhere to the surface of the particulate material.

In consideration of the achievement of conductivity and the diffusion properties of lithium ions, the thickness of the conductive layer is preferably 1 nm to 200 nm, more preferably 5 nm to 100 nm. The thickness of the conductive layer can be measured through sectional observation of the particles with an SEM or a TEN.

A step of cleaning the silicon composite particles with acid may be performed. For example, by cleaning the silicon composite particles with an acidic aqueous solution, a tiny amount of a component such as $Li_2SiO_3$ that can be produced when the raw material silicon and the lithium silicate are combined can be dissolved and thereby be removed. As the acidic aqueous solution, an aqueous solution of an inorganic acid such as hydrochloric acid, hydrofluoric acid, sulfuric acid, nitric acid, phosphoric acid, or carbonic acid or an aqueous solution of an organic acid such as citric acid or acetic acid can be used.

Figure 1:
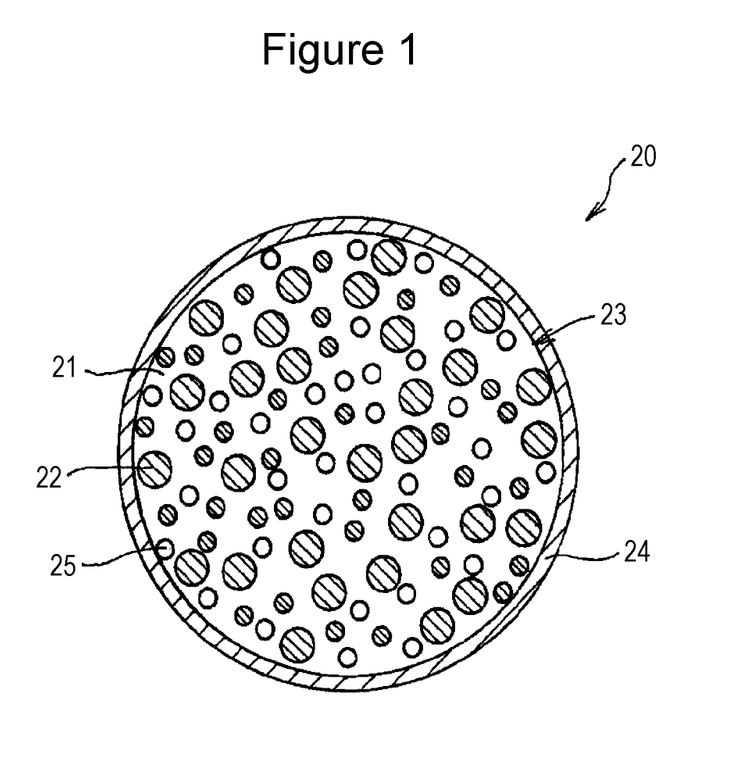
FIG. 1 is a sectional schematic view of the structure of a silicon composite particle according to an embodiment of the present disclosure.

FIG. 1 schematically illustrates a section of a silicon composite particle 20 in an example of the silicon composite.

The silicon composite particle 20 includes a lithium silicate phase 21 and silicon particles 22 dispersed in the lithium silicate phase. A conductive layer 24 may be formed on the surface of a base particle 23 formed of the lithium silicate phase 21 and the silicon particles 22. The conductive layer 24 is formed of a conductive material coating at least a portion of the surface of the silicon composite particle or the base particle 23. The silicon composite particle 20 may further include particles 25 containing an element Me dispersed in the lithium silicate phase. The element Me is at least one kind selected from the group consisting of rare-earth elements and alkaline-earth elements, and, preferably, is at least one kind selected from the group consisting of Y, Ce, Mg, and Ca. The element Me is, for example, present in the particles 25 in the state of an oxide and has a preventive or reductive effect on the side reaction between the lithium silicate phase and/or the silicon particles and the electrolyte.

The base particle 23 has, for example, an island-in-the-sea structure, and contains on a freely selected section thereof, the fine silicon (elementary substance: Si) particles 22 and the fine particles 25 containing an element Me substantially uniformly scattered in a matrix of the lithium silicate phase 21 without being localized in a partial region.

The lithium silicate phase 21 is preferably formed of particles finer than the silicon particles 22. In this case, in an X-ray diffraction (XRD) pattern of the silicon composite particle 20, the intensity of the diffraction peak attributed to the (111) plane of the elementary substance Si is larger than the intensity of the diffraction peak attributed to the (111) plane of lithium silicate.

The base particle 23 may further contain other components in addition to the lithium silicate phase 21, the silicon particles 22, and the particles 25 containing an element Me or a compound of a third metal. For example, the lithium silicate phase 21 may contain, in addition to the lithium silicate, $SiO_2$ substantially in the form of a natural oxidation film formed on the surface of the silicon particles.

In the base particles 23, the half-width of a diffraction peak of the (111) plane of the lithium silicate phase 21 measured through XRD (2θ is the horizontal axis) is desirably 0.05° or more before charging/discharging. In this case, high lithium ion conductivity in the particles is maintained. In the base particles 23, the half-width is desirably 0.55° or less. In this case, high regularity in the arrangement of the lithium atoms and the silicon atoms in the lithium silicate phase can be maintained. Because the fluorine atoms in the above-described polymer film are regularly present in the repeating structure of the polymer, when the half-width is 0.55° or less, a stronger mutual attraction exists between the lithium atoms and the silicon atoms and the fluorine atoms, and thus the adhesion between the base particles and the polymer can be enhanced.

Accordingly, when the half-width is in a range of 0.05° to 0.55°, a preventive or reductive effect on the deterioration in rate performance can be further enhanced.

However, the content of 3102 in the base particles 23 measured through Si-NMR is, for example, preferably 30% by mass or less, more preferably 7% by mass or less. In an XRD pattern obtained through X-ray diffraction (XRD) measurement of the base particles before charging/discharging, a peak attributed to $SiO_2$ (peak observable at 2θ=22° to 23°) is preferably substantially unobservable. Because $SiO_2$ reacts with lithium during charging to form a phase having low crystallinity, when the base particles 23 have a large $SiO_2$ content, the regularity in atomic arrangement in the particle deteriorates, and as a result, the adhesion between the base particles and the polymer is likely to be decreased.

Even when the base particles contain $SiO_2$ as a natural oxidation film, the peak at 2θ=22° to 23° is unobservable in an XRD pattern obtained through XRD measurement. A conceivable reason therefor is that because the natural oxidation film is extremely thin, the X-ray exhibits no diffraction. On the other hand, in known $SiO_x$ particles, the peak at 2θ=22° to 23° is observable in an XRD pattern. In such $SiO_x$ particles, due to low regularity in atomic arrangement, the half-width of the peak is largely increased.

The same tendency as described above applies after an SEI film is formed on the surface of the base particles after charging/discharging. The silicon composite particles having a diffraction peak of (111) with a half-width of 0.05° to 0.55° have high regularity in atomic arrangement and thus can enhance the adhesion between the base particles and the polymer. On the other hand, in known $SiO_x$ particles, due to low regularity in atomic arrangement (a broad XRD peak) after charging/discharging, the adhesion between the base particles and the polymer is low.

The conditions for measuring the half-width of a diffraction peak of the (111) plane of the lithium silicate is presented below. When plural kinds of lithium silicates such as $Li_2SiO_3$ and $Li_2Si_2O_5$ coexist in the base particles, the half-width (° (2θ)) of a peak of the (111) plane of each lithium silicate is measured. When a diffraction peak of the (111) plane of lithium silicate overlaps a diffraction peak of other plane indices or a diffraction peak of another substance, the diffraction peak of the (111) plane of the lithium silicate is isolated and thereafter the half-width thereof is measured.

Measuring apparatus: X-ray diffractometer (Model: RINT-TTR II), manufactured by Rigaku Corporation
Anticathode: Cu-Kα
Tube voltage: 50 kv
Tube current: 300 mA
Optical system: Parallel beam method [Incident side: multilayer film mirror (angle of divergence: 0.05°, beam width: 1 mm), Soller slits (5°), Light-receiving side: long slits PSA200 (resolution: 0.057°), Soller slits)(5° ]
Scan step: 0.01° or 0.02°
Counting time: 1 to 6 sec Next, a secondary battery according to the embodiment of the present disclosure will be described in detail. The secondary battery includes, for example, a negative electrode, a positive electrode, and an electrolytic solution as described below.

[Negative Electrode]

The negative electrode includes, for example, a negative electrode current collector and a negative electrode mixture layer formed on the surface of the negative electrode current collector and containing a negative electrode active material. The negative electrode mixture layer can be formed by coating the surface of the negative electrode current collector with a negative electrode slurry obtained by dispersing a negative electrode mixture in a dispersion medium and drying the negative electrode slurry. The dried coating film may be rolled as needed. The negative electrode mixture layer may be formed on one surface or both surfaces of the negative electrode current collector.

The negative electrode mixture contains, as an essential component, the silicon composite serving as a negative electrode active material, and can contain, as optional components, for example, a binder, a conductive agent, and a thickener. The silicon particles contained in the silicon composite can occlude many lithium ions and thus contribute to a higher capacity of the negative electrode.

The negative electrode active material may further contain a carbon material that electrochemically occludes and releases lithium ions. The silicon composite expands and contracts in volume in association with charging/discharging. Accordingly, when the proportion of the silicon composite in the negative electrode active material is increased, a contact failure is likely to occur between the negative electrode active material and the negative electrode current collector in association with charging/discharging. On the other hand, by using the silicon composite in combination with the carbon material, excellent cycle characteristics can be achieved while imparting a high capacity of the silicon particles to the negative electrode. The proportion of the silicon composite in the total amount of the silicon composite and the carbon material is, for example, preferably 3% to 30% by mass. With this configuration, a combination of a higher capacity and enhanced cycle characteristics is easily achieved.

Examples of the carbon material include graphites, graphitizable carbons (soft carbon), and non-graphitizable carbons (hard carbon). Among these, a graphite having excellent charge/discharge stability and also having a small irreversible capacity is preferable. The term graphite refers to a material having a graphite crystal structure. Examples of the graphite include natural graphites, artificial graphites, and graphitized mesophase carbon particles. The carbon materials may be used alone or in a combination of two or more kinds.

As the negative electrode current collector, a nonporous conductive substrate (e.g., a metal foil) or a porous conductive substrate (e.g., a mesh, a net, or a punched sheet) is used. Examples of the material forming the negative electrode current collector include stainless steel, nickel, nickel alloys, copper, and copper alloys. The thickness of the negative electrode current collector is not particularly limited, but is preferably 1 µm to 50 µm, more desirably 5 µm to 20 µm, in view of a balance between the strength of the negative electrode and the saving of weight.

Examples of the binder include: resin materials, for example, fluororesins such as polytetrafluoroethylene and polyvinylidene fluoride (PVDF); polyolefin resins such as polyethylene and polypropylene; polyamide resins such as aramid resin; polyimide resins such as polyimide and polyamide-imide; acrylic resins such as polyacrylic acid, polymethyl acrylate, and ethylene-acrylic acid copolymers; vinyl resins such as polyacrylonitrile and polyvinyl acetate; polyvinylpyrrolidone; polyether sulfone; and rubbery materials such as styrene-butadiene copolymer rubber (SER). These may be used alone or in a combination of two or more kinds.

Examples of the conductive agent include: carbon blacks such as acetylene black; conductive fibers such as carbon fibers and metal fibers; carbon fluoride; metal powders such as aluminum; conductive whiskers such as zinc oxide and potassium titanate; conductive metal oxides such as titanium oxide; and organic conductive materials such as phenylene derivatives. These may be used alone or in a combination of two or more kinds.

Examples of the thickener include cellulose derivatives (e.g., cellulose ethers) such as carboxymethyl cellulose (CMC), modified forms thereof (including salts such as a Na salt), and methyl cellulose; polymers having a vinyl acetate unit, such as polyvinyl alcohol, that are hydrolyzed; and polyethers (e.g., polyalkylene oxides such as polyethylene oxide). These may be used alone or in a combination of two or more kinds.

The dispersion medium is not particularly limited, but examples thereof include water, alcohols such as ethanol, ethers such as tetrahydrofuran, amides such as dimethyl formamide, N-methyl-2-pyrrolidone (NMP), and mixed solvents of the foregoing.

[Positive Electrode]

The positive electrode includes, for example, a positive electrode current collector and a positive electrode mixture layer formed on the surface of the positive electrode current collector. The positive electrode mixture layer can be formed by coating the surface of the positive electrode current collector with a positive electrode slurry obtained by dispersing a positive electrode mixture in a dispersion medium and drying the positive electrode slurry. The dried coating film may be rolled as needed. The positive electrode mixture layer may be formed on one surface or both surfaces of the positive electrode current collector.

As the positive electrode active material, a lithium transition metal oxide is preferable. Examples of transition metal elements include Sc, Y, Mn, Fe, Co, Ni, Cu, and Cr. Among these, for example, Mn, Co, and Ni are preferable, and Ni is particularly preferable. The lithium transition metal oxide is more preferably a lithium-nickel composite oxide containing Li, Ni, and other metals.

The lithium-nickel composite oxide is, for example, $Li_aNi_bM_{1-b}O_2$ (wherein M is at least one kind selected from the group consisting of Mn, Co, and Al, and $0<a\leq1.2$ and $0.3\leq b\leq1$ are satisfied). In view of a higher capacity, more preferably, $0.8\leq b\leq1$ is satisfied. In view of the stability of the crystal structure, $Li_aNi_bCo_cAl_dO_2$ ($0<a\leq1.2$, $0.85\leq b<1$, $0<c<0.15$, $0<d\leq0.1$, $b+c+d=1$) containing Co and Al as M is even more preferable. The value a representing the molar ratio of lithium is increased or decreased in association with charging/discharging.

Specific examples of the lithium-nickel composite oxide include lithium-nickel-cobalt-manganese composite oxides (e.g., $LiNi_{0.5}Co_{0.2}Mn_{0.3}O_2$, $LiNi_{1/3}Co_{1/3}Mn_{1/3}O_2$, and $LiNi_{0.4}Co_{0.2}Mn_{0.4}O_2$), lithium-nickel-manganese composite oxides (e.g., $LiNi_{0.5}Mn_{0.5}O_2$), lithium-nickel-cobalt composite oxides (e.g., $LiNi_{0.8}Co_{0.2}O_2$), and lithium-nickel-cobalt-aluminum composite oxides (e.g., $LiNi_{0.8}Co_{0.15}Al_{0.05}O_2$, $LiNi_{0.8}Co_{0.18}Al_{0.02}O_2$, and $LiNi_{0.88}Co_{0.09}Al_{0.03}O_2$).

As the binder and the conductive agent, the same materials as in the examples for the negative electrode can be used. As the conductive agent, a graphite such as a natural graphite or an artificial graphite may be used.

The form and thickness of the positive electrode current collector can be selected from the form and range of the negative electrode current collector. Examples of the material forming the positive electrode current collector include stainless steel, aluminum, aluminum alloys, and titanium.

[Electrolytic Solution]

The electrolytic solution contains a solvent and a lithium salt dissolved in the solvent. The concentration of the lithium salt in the electrolytic solution is, for example, 0.5 mol/L to 2 mol/L. The electrolytic solution may contain publicly known additives.

Examples of the solvent include, in addition to the above-described fluorine-containing linear carboxylic acid ester, nonaqueous solvents such as a cyclic carbonic acid ester, a linear carbonic acid ester, a cyclic carboxylic acid ester, and a linear carboxylic acid ester. The electrolytic solution may contain an ester of a carboxylic acid containing fluorine and an alcohol containing no fluorine. For example, the electrolytic solution may contain methyl 3,3,3-trifluoropropionate ($F_3C-CH_2-(CO)O-CH_3$) (FMP). When the electrolytic solution contains FMP, the content of FMP in the solvent is preferably 40% by volume or less. FMP is desirably used in combination with the fluorine-containing linear carboxylic acid ester.

As the cyclic carbonic acid ester, for example, ethylene carbonate (EC), fluoroethylene carbonate (FEC), propylene carbonate (PC), butylene carbonate, vinylene carbonate, vinyl ethylene carbonate, or a derivative of the foregoing can be used. These can be used alone or in a combination of two or more kinds. In view of the ionic conductivity of the electrolytic solution, at least one from the group consisting of ethylene carbonate, fluoroethylene carbonate, and propylene carbonate is preferably used.

Examples of the linear carbonic acid ester include diethyl carbonate (DEC), ethyl methyl carbonate (EMC), and dimethyl carbonate (DMC).

Examples of the cyclic carboxylic acid ester include γ-butyrolactone (GBL) and γ-valerolactone (GVL).

As the linear carboxylic acid ester, for example, methyl acetate (MA), ethyl acetate (EA), propyl acetate, methyl propionate, ethyl propionate, or propyl propionate can be used.

These solvents may be used alone or in a combination of two or more kinds.

When the electrolytic solution contains methyl 3,3,3-trifluoropropionate ($F_3C$—$CH_2$—(CO)O—$CH_3$) (FMP), the HF elimination reaction in Formula (4) below can selectively proceed on the surface of the silicon composite particles (base particles).

[Chem. 4]

FMP (4)

As a result of the reaction product in Formula (4) undergoing repeated polymerization, a polymer having a unit structure in Formula (5) below can be produced. Each "*" in Formula (5) represents a bond.

[Chem. 5]

(5)

The polymer in Formula (5) also can form an SEI on the surface of the base particles. A strong mutual attraction exists between the F atoms in the polymer and the Li atoms and the Si atoms in lithium silicate, thereby causing the base particles and the polymer to adhere to one another and enhancing the strength of the base particle surface. However, the polymer in Formula (5), with a lithium ion coordinated to a carbonyl group in a side chain, has a lithium ion conduction pathway differing from that of the polymer in Formula (2).

As the lithium salt, for example, a lithium salt of a chlorine-containing acid (e.g., $LiClO_4$, $LiAlCl_4$, or $LiB_{10}Cl_{10}$, a lithium salt of a fluorine-containing acid (e.g., $LiPF_6$, $LiBF_4$, $LiSbF_6$, $LiAsF_6$, $LiCF_3SO_3$, or $LiCF_3CO_2$), a lithium salt of a fluorine-containing acid imide (e.g., LiN$(SO_2F)_2$LiN$(CF_3SO_2)_2$, LiN$(CF_3SO_2)(C_4F_9SO_2)$, or LiN$(C_2F_5SO_2)_2$), or a lithium halide (e.g., LiCl, LiBr, or LiI) can be used. These lithium salts may be used alone or in a combination of two or more kinds.

[Separator]

Usually, it is desirable that a separator is interposed between the positive electrode and the negative electrode. The separator has high ion permeability and moderate mechanical strength and insulating properties. As the separator, for example, a microporous thin film, a woven fabric, or a nonwoven fabric can be used. The material forming the separator is preferably polyolefin such as polypropylene or polyethylene.

An example of the structure of the secondary battery is a structure in which an electrode assembly formed by coiling the positive electrode and the negative electrode with the separator interposed therebetween and the electrolytic solution are housed in an outer cover. The coiled electrode assembly may be replaced with a different form of the electrode assembly, for example, a layered electrode assembly formed by layering the positive electrode and the negative electrode with the separator interposed therebetween. The secondary battery may take any form, such as of a cylinder, a rectangle, a coin, a button, or a laminate.

Figure 2:
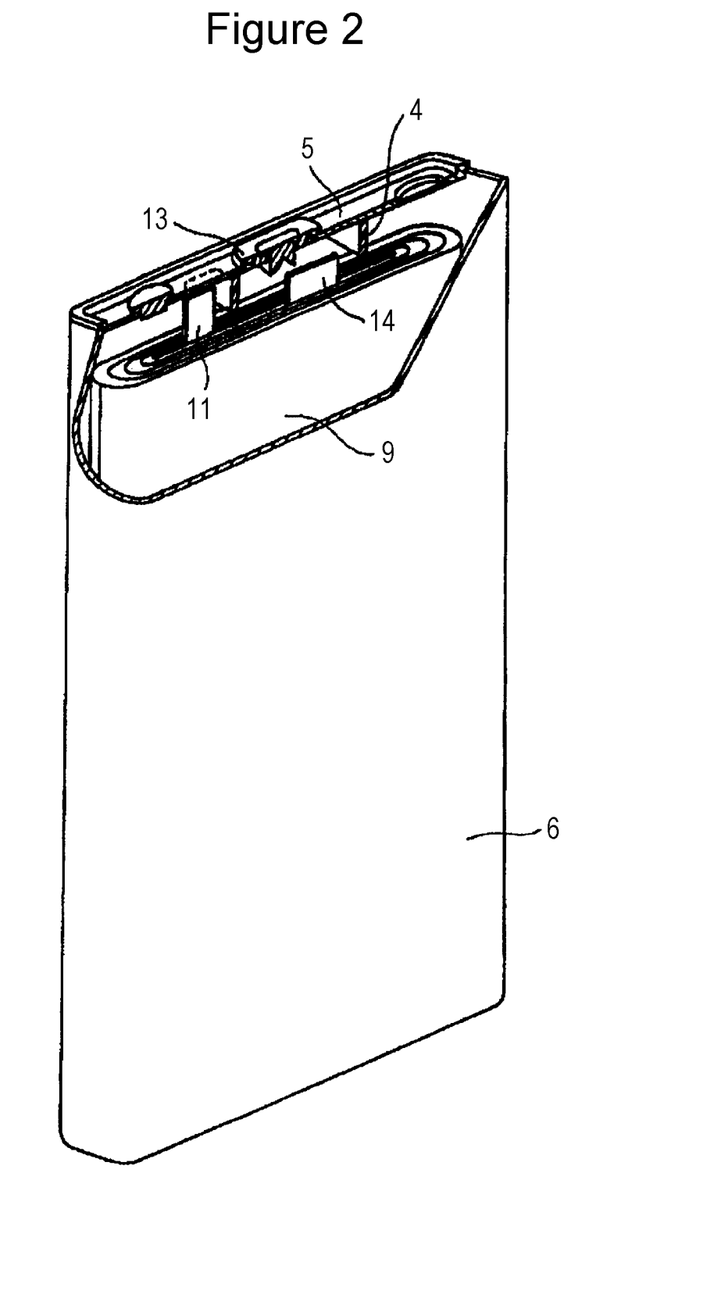
FIG. 2 is a schematic, partially cut-away, perspective view of a secondary battery according to an embodiment of the present disclosure.

FIG. 2 is a schematic, partially cut-away, perspective view of a rectangular secondary battery according to the embodiment of the present disclosure.

The battery includes a bottomed rectangular battery housing 6 and an electrode assembly 9 and a nonaqueous electrolyte (not illustrated) that are housed in the battery housing 6. The electrode assembly 9 has a long strip-formed negative electrode, a long strip-formed positive electrode, and a separator interposed between the positive electrode and the negative electrode and keeping these from being in direct contact with one another. The electrode assembly 9 is formed by coiling the negative electrode, the positive electrode, and the separator 3 around a flat plate-like coiling core, and thereafter removing the coiling core.

One end of a negative electrode lead 11 is attached to the negative electrode current collector of the negative electrode, by way of, for example, welding. One end of a positive electrode lead 14 is attached to the positive electrode current collector of the positive electrode, by way of, for example, welding. The other end of the negative electrode lead 11 is electrically connected to a negative electrode terminal 13 disposed at a sealing plate 5. The other end of the positive electrode lead 14 is electrically connected to the battery housing 6 also serving as a positive electrode terminal. A resin frame 4 is disposed on an upper portion of the electrode assembly 9, the frame 4 isolating the electrode assembly 9 from the sealing plate 5 and isolating the negative electrode lead 11 from the battery housing 6. The opening of the battery housing 6 is sealed with the sealing plate 5.

The secondary battery may have a structure such as of a cylinder, a coin, or a button that includes a metal battery housing or of a laminated battery that includes a battery housing formed of a laminated sheet which is a layered body of a barrier layer and a resin sheet.

Hereafter, the present disclosure will be specifically described based on Examples and Comparative Examples. However, the Examples below are not intended to limit the present disclosure.

<Battery A1>
[Preparation of Silicon Composite]

Silicon dioxide was mixed with lithium carbonate such that an atomic ratio: Si/Li of 1.05 was achieved. The mixture was fired in air at 950° C. for 10 hours to thereby obtain lithium silicate represented by the formula: $Li_2Si_2O_5$ (u=0.5). The obtained lithium silicate was pulverized to have an average particle diameter of 10 µm.

The lithium silicate ($Li_2Si_2O_5$) having an average particle diameter of 10 µm and raw material silicon (3N, average particle diameter: 10 µm) were mixed in a mass ratio of 45:55. The mixture was filled into a pot (made of SUS, volume: 500 mL) of a planetary ball mill (P-5, manufactured by Fritsch Co., Ltd.), and 24 SUS balls (diameter: 20 mm) were placed therein. In the pot with the lid closed, the mixture was pulverized at 200 rpm for 50 hours in an inert atmosphere.

Next, the powdered mixture was removed in an inert atmosphere and was then fired at 800° C. for 4 hours, in an inert atmosphere, with pressure applied by a hot press, to obtain a sintered body of the mixture (silicon composite particles (base particles)).

The silicon composite particles were then pulverized and passed through a 40 µm-mesh, and thereafter mixed with a coal pitch (MCP 250, manufactured by JFE Chemical Corporation). The mixture was fired at 800° C. in an inert atmosphere. The surface of the silicon composite particles was coated with conductive carbon to thereby form a conductive layer on the surface. The coating amount of the conductive layer was 5% by mass with respect to the total mass of the silicon composite particles and the conductive layer. Subsequently, a sieve was used to obtain silicon composite particles including the conductive layer and having an average particle diameter of 5 µm.

[Analysis of Silicon Composite Particles]

The crystallite size of silicon particles calculated with the Scherrer formula from a diffraction peak attributed to the Si (111) plane through XRD analysis of the silicon composite particles was 20 nm. The half-width of a diffraction peak of the (111) plane of a lithium silicate phase was 0.43°.

The composition of the lithium silicate phase was analyzed through the above-described methods (high-frequency induction heating furnace combustion-infrared absorption method, inert gas fusion-nondispersive infrared absorption method, inductively coupled plasma emission spectrometry (ICP-AES)). The results indicated that the Si/Li ratio was 1.0 and the content of $Li_2Si_2O_5$ measured through Si-NMR was 45% by mass (the content of the silicon particles was 55% by mass).

[Production of Negative Electrode]

The silicon composite particles including the conductive layer were mixed with a graphite in a mass ratio of 15:85, and the mixture was used as a negative electrode active material. The negative electrode active material, sodium carboxymethyl cellulose (CMC-Na), and styrene-butadiene rubber (SER) were mixed in a mass ratio of 97.5:1:1.5, and water was added thereto. The mixture was then stirred with a mixer (T.K. HIVIS MIX, manufactured by PRIMIX Corporation) to thereby prepare a negative electrode slurry. Next, the surface of a copper foil was coated with the negative electrode slurry such that the mass of a negative electrode mixture per 1 m² of the surface of the copper foil was 190 g. The coating film was dried and thereafter rolled to produce a negative electrode with a negative electrode mixture layer having a density of 1.5 g/cm³ formed on both surfaces of the copper foil.

[Preparation of Electrolytic Solution]

As a solvent, 2,2,2-trifluoroethyl acetate (FEA) was prepared. The 2,2,2-trifluoroethyl acetate containing 0.015% by mass of 2-chloro-1,1-difluoroethyl-2,2,2-trifluoroethyl ether was used.

Fluoroethylene carbonate (FEC) and the 2,2,2-trifluoroethyl acetate (FEA) were mixed in a volume ratio of 20:80 to prepare a mixed solvent. $LiPF_6$ serving as a lithium salt was dissolved in the mixed solvent to achieve a concentration of 1.0 mol/L and to thereby produce an electrolytic solution.

[Production of Secondary Battery]

Leads were attached to the produced negative electrode (20×20 mm) and to a Li metal counter electrode (25×30 mm). Next, an electrode assembly was produced such that the negative electrode and the Li metal counter electrode face one another with a separator interposed therebetween. The electrode assembly, together with the electrolytic solution, was enclosed in an outer cover formed of an aluminum laminated film to thereby produce a nonaqueous electrolyte secondary battery.

A battery A1 for evaluating a negative electrode, the battery including the Li metal counter electrode, was thus produced.

<Battery A2>

In preparation of an electrolytic solution, fluoroethylene carbonate (FEC), 2,2,2-trifluoroethyl acetate (FEA), and methyl 3,3,3-trifluoropropionate (FMP) were mixed in a volume ratio of 20:40:40 to prepare a mixed solvent. As in Example 1, the FEA containing 2-chloro-1,1-difluoroethyl-2,2,2-trifluoroethyl ether was used.

The same procedure was performed as in Example 1 to produce a battery A2 except for the above-described point.

<Battery A3>

In preparation of an electrolytic solution, FEA containing no 2-chloro-1,1-difluoroethyl-2,2,2-trifluoroethyl ether was prepared, and FEC and the FEA were mixed in a volume ratio of 20:80 to prepare a mixed solvent.

The same procedure was performed as with the battery A1 to produce a battery A3 except for the above-described point.

<Battery B1>

In preparation of an electrolytic solution, fluoroethylene carbonate (FEC) and methyl 3,3,3-trifluoropropionate (FMP) were mixed in a volume ratio of 20:80 to prepare a mixed solvent. The same procedure was performed as with the battery A1 to produce a battery B1 except for the above-described point.

<Battery B2>

In preparation of an electrolytic solution, fluoroethylene carbonate (FEC) and ethyl trifluoroacetate (EFA) were mixed in a volume ratio of 20:80 to prepare a mixed solvent. The Li salt was dissolved only at about 0.1 mol/L, but the resulting electrolytic solution was used as it was. The same procedure was performed as with the battery A1 to produce a battery B2 except for the above-described point.

<Battery B3>

In preparation of an electrolytic solution, fluoroethylene carbonate (FEC) and ethyl methyl carbonate (EMC) were mixed in a volume ratio of 20:80 to prepare a mixed solvent. The same procedure was performed as with the battery A1 to produce a battery B3 except for the above-described point.

<Battery C1>

In production of a negative electrode, silicon particles $SiO_x$ (X=1.00) including a conductive layer and a graphite were mixed in a mass ratio of 15:85, and the mixture was used as a negative electrode active material. The same procedure was performed as with the battery A1 to produce a battery C1 except for the above-described point.

The batteries A1 to A3 and the batteries B1 to B3 were each evaluated through the following method.

[Evaluation]

Charging of the produced secondary battery was performed at 0.2 C in a constant-temperature environment of 25° C. until the negative electrode potential reached 0.0 V (against the Li counter electrode). After charging, discharging was performed at 0.2 C until the negative electrode potential reached 1.0 V (against the Li counter electrode). This charging/discharging was repeated 10 cycles.

Under the same charging conditions, charging was performed at 0.2 C and thereafter discharging was performed at 0.5 C to thereby calculate the high-rate discharge capacity CH. Subsequently, under the same charging conditions, charging was performed again at 0.2 C and thereafter discharging was performed at 0.05 C to thereby calculate the low-rate discharge capacity CL. The ratio CH/CL of the discharge capacity CH at 0.5 C to the discharge capacity CL at 0.05 C was then calculated. The discharge rate performance thus determined was evaluated.

Table 1 presents the evaluation results of the discharge capacity CH, the discharge capacity CL, and the discharge rate performance CH/CL of the batteries A1 to A3 and the batteries B1 to B6. In Table 1, the discharge capacity CH and the discharge capacity CL are expressed as relative values, with the low-rate discharge capacity CL of Example 1 being 100.

The battery internal resistance of the batteries A1 and C1 was evaluated through the following method.

Charging was performed at 0.2 C in a constant-temperature environment of 25° C. until the negative electrode potential reached 0.0 V (against the Li counter electrode). After charging, discharging was performed at 0.2 C. The voltage V0 after charging and the voltage V1 after 5 seconds after the start of discharging were compared. The current value at 0.2 C was determined as 1, and the direct-current internal resistance r of the battery was evaluated with the formula below.

$$V1=V0-rI$$

Through the above-described method, the direct-current internal resistance was measured before and after repeating the charging/discharging at 0.2 C 10 cycles. When the direct-current internal resistance before the charge/discharge cycle was determined as r1 and the direct-current internal resistance after the charge/discharge cycle was determined as r2, the change rate of the direct-current internal resistance Δr (8) was calculated with the formula below.

$$\Delta r=(r2/r1)\times 100$$

TABLE 1

| Battery | Discharge capacity CH | Discharge capacity CL | Discharge rate performance CH/CL (%) |
|---|---|---|---|
| A1 | 96 | 100 | 96 |
| A2 | 95 | 99 | 96 |
| A3 | 92 | 98 | 94 |
| B1 | 89 | 113 | 79 |

TABLE 1-continued

| Battery | Discharge capacity CH | Discharge capacity CL | Discharge rate performance CH/CL (%) |
|---|---|---|---|
| B2 | 0.2 | 79 | 0.3 |
| B3 | 31 | 54 | 58 |

As revealed in Table 1, the batteries A1 to A3 have both a high high-rate discharge capacity CH and a high low-rate discharge capacity CL and excel in the discharge rate performance CH/CL. The batteries A1 to A3 containing, with respect to the entire solvent, 40% by volume or more of the fluorine-containing linear carboxylic acid ester represented by $R^1$—(CO)O—$CH_2$—$R^2$ wherein $R^2$ contains a fluorine group maintain high discharge rate performance compared with the battery B1.

FMP which was used in the battery B1 is a linear carboxylic acid ester containing fluorine, wherein the fluorine is contained in $R_1$. In this case, compared with the case of the batteries B2 and B3, the deterioration in the high-rate discharge capacity CH is prevented or reduced, and thus the deterioration in discharge rate performance is prevented or reduced. However, the preventive or reductive effect is small compared with the case of the battery A1. When FMP is used, the polymer in Formula (5) is produced. Compared with the case of the FEA-derived polymer in Formula (2), in the FMP-derived polymer, an O atom to which a lithium ion is coordinated is positioned in a side chain. In the case of the FEA-derived polymer, an O atom to which a lithium ion is coordinated is positioned in a main chain. That is, the polymers differ in whether the lithium ion conduction pathway is between side chains or between main chains. In the case of between side chains where a higher degree of freedom is provided to molecular chains, the transfer of lithium ions is more limited, and as a result, the internal resistance is increased. Accordingly, the FMP-derived polymer conceivably exhibits a decreased preventive or reductive effect on the deterioration in rate performance.

In the batteries B2 and B3, the high-rate discharge capacity CH and the low-rate discharge capacity CL are both deteriorated, and especially the deterioration in the high-rate discharge capacity CH is remarkable. As a result, the discharge rate performance CH/CL is largely deteriorated. In EFA, a trifluoromethyl group having a single carbon chain is located on the left side ($R_1$) of a carbonyl carbon. Thus, in the reduction reaction, conceivably, neither the hydrogen atom elimination reaction as in Formula (1) nor the hydrogen fluoride elimination reaction as in Formula (4) proceeds, conceivably resulting in difficulty in the formation of a polymer in and of itself and thereby in the inability to prevent or reduce the occurrence of cracks in the base particles, causing a deterioration in rate performance. The poor solubility of the Li salt due to the fluorine atoms being present in the a position of the carbonyl group is also a factor contributing to a deterioration in battery characteristics. On the other hand, EMC contains no fluorine atoms, conceivably resulting in no adhesive effect exhibited between the base particles of the silicon composite and the polymer, causing a deterioration in rate performance.

The change rate Δr of the direct-current internal resistance of the batteries A1 and C1 was evaluated. When the change rate $\Delta r_{A1}$ of the direct-current internal resistance of the battery A1 was determined as 100, the change rate $\Delta r_{C1}$ of the direct-current internal resistance of the battery C1 was 106 ($\Delta r_{C1}/\Delta r_{A1}=1.06$). That is, the results reveal that a battery that includes a negative electrode containing the silicon composite and an electrolytic solution containing the above-described fluorine-containing linear carboxylic acid ester is capable of preventing or reducing an increase in the internal resistance in association with repeated charging/discharging compared with a battery that includes a negative electrode containing $SiO_x$ and an electrolytic solution containing the fluorine-containing linear carboxylic acid ester.

A conceivable reason therefor is that, compared with $SiO_x$, the above-described silicon composite has high regularity in the arrangement of the lithium atoms and the silicon atoms in the lithium silicate phase, thus exhibiting high adhesion to a polymer film.

Thus, when a battery that includes a negative electrode containing the silicon composite includes an electrolytic solution containing the fluorine-containing linear carboxylic acid ester, the overproduction of an SEI film is prevented or reduced. Accordingly, it is possible to realize a secondary battery in which the rate performance is improved and the production of irreversible capacity and an increase in the internal resistance in association with charging/discharging are prevented or reduced.

While the present invention has been described with reference to the currently preferred embodiments, the disclosure should not be narrowly construed. Having read the foregoing disclosure, various modifications and amendments can be clearly made apparent to those skilled in the art in the technical field of the present invention. Thus, the appended claims should be construed to include all variations and amendments without departing from the true spirit and scope of the present invention.

INDUSTRIAL APPLICABILITY

The secondary battery according to the present disclosure, because of being resistant to the deterioration in performance even when high-rate current discharging is performed and because of having a high capacity, is useful as a main power supply for, for example, mobile communication devices and portable electronic devices and as a vehicle power source such as an in-vehicle battery.

REFERENCE SIGNS LIST

4: frame, 5: sealing plate, 6: battery housing, 9: electrode assembly, 11: negative electrode lead, 13: negative electrode terminal, 14: positive electrode lead, 20: silicon composite particle, 21: lithium silicate phase, 22: silicon particle, 23: base particle, 24: conductive layer, 25: particle containing element Me

The invention claimed is:

1. A secondary battery comprising a negative electrode containing a silicon composite particle which includes a lithium silicate phase and silicon particles dispersed in the lithium silicate phase, and
an electrolytic solution containing a fluorine-containing linear carboxylic acid ester represented by $R^1$—(CO)O—$CH_2$—$R^2$ (wherein $R^1$ is an alkyl group and $R^2$ is an alkyl group in which at least one hydrogen atom is substituted with fluorine),
wherein the electrolytic solution further contains 2-chloro-1,1-difluoroethyl-2,2,2-trifluoroethyl ether.

2. The secondary battery according to claim 1, wherein the fluorine-containing linear carboxylic acid ester contains 2,2,2-trifluoroethyl acetate.

3. The secondary battery according to claim 1, wherein the electrolytic solution further contains methyl 3,3,3-trifluoropropionate.

4. The secondary battery according to claim 1, wherein, in the lithium silicate phase, a half-width of a diffraction peak of a (111) plane of lithium silicate phase in an XRD pattern measured through X-ray diffraction analysis is 0.05° to 0.55°.

5. The secondary battery according to claim 1, wherein at least a portion of a surface of the silicon composite particle is coated with a conductive material.

* * * * *